Patented Apr. 16, 1940

2,197,459

UNITED STATES PATENT OFFICE 2,197,459

PHTHALOCYANINE COLORING MATTER

Max Wyler, Blackley, Manchester, England, assignor to Imperial Chemical Industries Limited, a corporation of Great Britain No Drawing. Application December 6, 1937, Serial No. 178,430. In Great Britain December 9, 1936

6 Claims. (Cl. 260—314)

In British Specification No. 410,814 a process is described for making compounds now known as metal and metal-free phthalocyanines from o-arylene dicyanides of the benzene or naphthalene series. A tin phthalocyanine is described. It is also described how the products may be purified by dissolving them in concentrated sulphuric acid and precipitating by dilution with water and it is indicated that this treatment brings about only a purification in some cases, whereas with some metal phthalocyanines it also causes a decomposition, so that metal-free phthalocyanine is obtained. Tin phthalocyanines are now known to undergo decomposition when so treated.

Another process for making metal free phthalocyanine is described in British Specification No. 390,149.

The present invention relates to an improved process of making tin phthalocyanines. As these when dissolved in sulphuric acid lose their metal, the invention relates also to an improved process for making metal-free phthalocyanines. The invention is directed primarily to obviating complexities of earlier processes in respect of supply of starting materials.

According to the invention, tin phthalocyanines are made by heating together to reaction temperature a phthalic anhydride or the corresponding free acid, or its ammonium salt, amide, imide, or an ortho-cyano-benzoic acid or its ammonium salt, with urea or a heat-decomposition product thereof and a substance consisting of or containing tin, preferably the free metal or a salt thereof.

The groups of compounds listed above to which the process of the invention is applicable can be conveniently brought together under a general formula as compounds of the formula "R(COONH$_4$)$_2$ minus $x$H$_2$O minus $y$NH$_3$," wherein R stands for an o-arylene radical of the benzene series, $x$ stands for 0, 1, 2 or 3, $y$ stands for 0, 1 or 2, but the sum of $x$ and of $y$ does not exceed 3. Thus phthalic acid has the formula C$_6$H$_4$·(COOH)$_2$; it corresponds therefore to the formula [R(COONH$_4$)$_2$ minus 2NH$_3$], wherein R stands for C$_6$H$_4$; in other words, $x$ is 0 and $y$ stands for 2. Likewise, phthalimide, having the formula

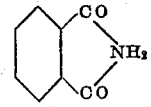

may be considered as derived from R(COONH$_4$)$_2$ by removing 2H$_2$O and 1NH$_3$; in other words, $x=2$ and $y=1$. Again, o-cyanobenzamide,

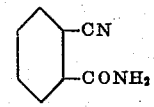

corresponds to the case where $x=3$ while $y=0$.

The group of compounds thus defined by this formula is rather limited; but the individual members thereof are closely interrelated, for in the presence of an ammonia furnishing reagent (which may function either as a reagent or as a diluent) and under conditions favoring the elimination of water, these compounds are all capable of furnishing phthalonitrile in transient state, which then reacts with the metal present to form a metal phthalocyanine.

As substance consisting of or containing tin any substance capable of being regarded as furnishing tin during the reaction may be used, and said substances are aptly designated stanniferous reagents. It will be understood that as the mechanism of the reaction is not clear, and as the products have almost certainly a constitution such that the tin is not in what is commonly understood to be inorganic combination, then many compounds of tin may be used.

When the reagents are heated together a fused mass is formed and at a temperature of about 200° C. the mass begins to turn green, a tin phthalocyanine being formed. The mass is conveniently stirred to keep it homogeneous. The tin or tin compound used may not, of course, dissolve. The temperature is kept at about 200–220° C. until no more coloring matter is formed, the mass becoming more and more pasty or eventually solid. It is convenient, indeed necessary to use some excess of urea. Some ammonia may be evolved.

In carrying the invention into practical effect it is, as already said, sufficient usually to mix the reagents, to apply heat, stir when the mixture is fluid, and then raise the temperature until pigment begins to be formed. Then to continue to heat or at least to keep hot until pigment formation ceases. The mass is then cooled, ground, suitably washed to remove excess of reagents if any, and purified or treated further as has been described in the British specification cited above.

If desired an additional flux, for instance kerosene, chloronaphthalene or nitrobenzene or similar organic liquid of high boiling point may be added. This facilitates manipulation of the cooled mass.

As substituted phthalic compounds which may be used as initial materials in this invention there are to mention the mono-, di-, and tri-halogenophthalic acids and their derivatives, the nitro-phthalic acids and their derivatives, the benzene-tri- and tetra-carboxylic acids, e. g., hemimellitic, trimellitic and pyromellitic acids. In connection with these it is to be noted that the process of the invention permits of the production of phthalocyanines from compounds not readily to be transformed into intermediate compounds suitable for use in the earlier processes.

It is convenient to note here that it is not possible to use an amount of urea to correspond with an equation that could be written on a stoichiometrical basis. Molecular equivalent proportions of urea and phthalic anhydride when heated together give phthalimide. Some excess of urea is needed to give a mixture of suitable consistency for manipulation and indeed, in this respect, a large excess is advantageous. The urea, in fact, behaves as a reagent and as a flux. As shown by the examples below, the preferred practice is to use over 2 moles of urea per mole of phthalic anhydride.

The reaction is facilitated if other compounds, conveniently described as ancillary agents, are present. Boric acid or compounds of molybdenum are examples of such ancillary agents; others may be used, for instance, any substance consisting of or containing an element of group V or group VI of the periodic system according to Mendelieff and having an atomic number between 15 and 92 inclusive may be used. A more detailed discussion of these, including various specific examples, is given in copending application of Albert Riley, Ser. No. 146,313.

The invention is illustrated, but not limited, by the following examples in which the parts are by weight.

Example 1

A mixture of 100 parts of urea and 38.2 parts of stannous chloride ($SnCl_2,H_2O$) are milled together at 130° C. and 100 parts of phthalic anhydride are added. The temperature is raised to 220° C. and kept there until formation of coloring matter is complete. The cooled mass is ground and extracted with hot dilute aqueous caustic soda and afterwards with hot dilute aqueous hydrochloric acid, and finally washed with water and dried. The product is a greenish blue crystalline powder.

This powder is stirred with about 10 times its weight of sulphuric acid of sp. gr. 1.84 or to advantage with about that amount of sulphuric acid containing some chlorosulphonic acid. When all is dissolved the mixture is poured with stirring into about 100 parts of cold water. A precipitate is formed. This is filtered off, washed with water until acid-free and dried. This is metal-free phthalocyanine $(C_8H_4N_2)_4H_2$.

Example 2

40 parts of phthalic anhydride, 48 parts of urea, 15.2 parts of stannous chloride, 0.8 part of boric acid and 0.08 part of ammonium molybdate are heated together as described in Example 1. Reaction takes place at 200–205° C. When it is complete the mass is allowed to cool and treated as in Example 1.

Example 3

25 parts of urea, 9.4 parts of stannous chloride ($SnCl_2 \cdot 2H_2O$), 30.5 parts of 4-chlorophthalic anhydride, are mixed and heated to 220° till coloring matter ceases to be formed. The mass is worked up as described in Example 1. 18 parts of a green powder is obtained. This may be used as a pigment to give bright green shades.

Example 4

15 parts of stannous chloride ($SnCl_2 \cdot 2H_2O$) and 30 parts of urea are heated to 200° C. 30 parts of 4-chlorophthalimide are added in portions to the molten mass with stirring. The temperature is raised to 270–280° C. and kept there for 19 hours. The product is cooled and ground, then boiled with a solution of 25 parts sodium hydroxide in 100 parts of water. It is then filtered, washed with hot water and dried at 100° C. The product is identical with that of Example 3.

The product of either of the above examples, treated as described in Example 1 with sulphuric acid or a mixture of sulphuric acid and chlorosulphonic acid gives tetrachloro(4)-phthalocyanine $(C_8H_3N_2Cl)_4H_2$.

I claim:

1. The process of producing a phthalocyanine coloring matter containing tin, which comprises heating together, in a medium of molten urea, a stanniferous reagent and a compound of the general formula

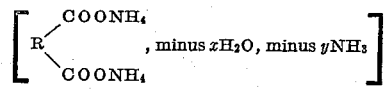

wherein R is an ortho-arylene radical selected from the group consisting of the benzene radicals and the naphthalene radicals, $x$ stands for an integer less than 4 but not less than 0, $y$ stands for an integer less than 3 but not less than 0, but the sum of $x$ and $y$ does not exceed 3.

2. The process of producing a phthalocyanine coloring matter containing tin, which comprises reacting a phthalic anhydride with stannous chloride in the presence of urea, the latter reagent being present in sufficient quantity to provide a fluid medium for the reaction mass during the initial stages of the reaction.

3. The process of producing a phthalocyanine coloring matter containing tin, which comprises heating together phthalic anhydride, stannous chloride and urea the latter reagent being present in excess of 2 moles per mole of phthalic anhydride, and recovering the coloring matter thus produced.

4. The process of producing a phthalocyanine coloring matter containing tin, which comprises heating together phthalic anhydride, stannous chloride and urea, in the presence of boric acid, the quantity of urea employed being in excess of 2 moles per mole of phthalic anhydride, and recovering the coloring matter thus produced.

5. The process of producing a phthalocyanine coloring matter containing tin, which comprises heating together phthalic anhydride, stannous chloride and urea, in the joint presence of boric acid and ammonium molybdate, the quantity of urea employed being in excess of 2 moles per mole of phthalic anhydride, and recovering the coloring matter thus produced.

6. The process of producing a phthalocyanine coloring matter containing tin, which comprises heating together 4-chloro-phthalic anhydride, stannous chloride and urea the latter reagent being present in excess of 2 moles per mole of 4-chloro-phthalic anhydride, and recovering the coloring matter thus produced.

MAX WYLER.

CERTIFICATE OF CORRECTION.

Patent No. 2,197,459. April 16, 1940.

MAX WYLER.

It is hereby certified that error appears in the printed specification of the above numbered patent requiring correction as follows: Page 1, second column, line 5, in the formula, for "$NH_2$" read --NH--; and that the said Letters Patent should be read with this correction therein that the same may conform to the record of the case in the Patent Office.

Signed and sealed this 4th day of June, A. D. 1940.

(Seal)

Henry Van Arsdale,
Acting Commissioner of Patents.